(12) United States Patent
Kawarada

(10) Patent No.: US 9,113,069 B2
(45) Date of Patent: Aug. 18, 2015

(54) IMAGING APPARATUS HAVING AN ATTACHED INTERCHANGEABLE LENS

(75) Inventor: Masahiro Kawarada, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 338 days.

(21) Appl. No.: 12/903,002

(22) Filed: Oct. 12, 2010

(65) Prior Publication Data
US 2011/0090393 A1 Apr. 21, 2011

(30) Foreign Application Priority Data
Oct. 19, 2009 (JP) ................................. 2009-240869

(51) Int. Cl.
H04N 5/225 (2006.01)
H04N 5/232 (2006.01)
H04N 5/238 (2006.01)

(52) U.S. Cl.
CPC ........... H04N 5/23209 (2013.01); H04N 5/238 (2013.01); H04N 5/23212 (2013.01)

(58) Field of Classification Search
CPC .................. G03B 9/02–9/07; H04N 5/23209; H04N 5/23212; H04N 5/238
USPC ................. 396/170, 235, 257–262, 449–451, 396/458–461, 505–510
See application file for complete search history.

(56) References Cited

U.S. PATENT DOCUMENTS

| | | | | |
|---|---|---|---|---|
| 5,953,062 A * | 9/1999 | Sugimori et al. | ............. | 348/364 |
| 7,760,999 B2 * | 7/2010 | Karasawa | ....................... | 396/64 |
| 2002/0027600 A1 * | 3/2002 | Yamanaka et al. | ............ | 348/208 |
| 2002/0071048 A1 * | 6/2002 | Kaneda | ........................ | 348/363 |
| 2002/0097324 A1 * | 7/2002 | Onuki | .......................... | 348/208 |
| 2004/0036793 A1 * | 2/2004 | Kanayama | .................... | 348/345 |
| 2004/0130652 A1 * | 7/2004 | Sasaki et al. | ................... | 348/349 |
| 2004/0201771 A1 * | 10/2004 | Itoh | ............................... | 348/363 |
| 2005/0062875 A1 * | 3/2005 | Ojima | .......................... | 348/362 |
| 2005/0220449 A1 * | 10/2005 | Hirai | .............................. | 396/79 |
| 2006/0132617 A1 * | 6/2006 | Ohta | .......................... | 348/220.1 |
| 2007/0024721 A1 * | 2/2007 | Rogers | ........................ | 348/229.1 |
| 2007/0116453 A1 * | 5/2007 | Uchiyama | ..................... | 396/246 |
| 2009/0027572 A1 * | 1/2009 | Kido et al. | ..................... | 348/751 |
| 2009/0109299 A1 * | 4/2009 | Nishiguchi et al. | ......... | 348/229.1 |
| 2009/0109320 A1 * | 4/2009 | Oi | ................................. | 348/345 |
| 2009/0185799 A1 * | 7/2009 | Kawarada | ..................... | 396/125 |
| 2009/0263120 A1 * | 10/2009 | Kurosawa | ..................... | 396/508 |
| 2009/0284612 A1 * | 11/2009 | Abe et al. | ................... | 348/221.1 |
| 2009/0290862 A1 * | 11/2009 | Shibuno | ........................ | 396/246 |
| 2010/0232779 A1 * | 9/2010 | Okamoto et al. | ............. | 396/257 |

FOREIGN PATENT DOCUMENTS

| | | |
|---|---|---|
| CN | 101493568 A | 7/2009 |
| JP | 05-344416 A | 12/1993 |
| JP | 6-088985 A | 3/1994 |
| JP | 07-170438 A | 7/1995 |
| JP | 09-093484 A | 4/1997 |
| JP | 2004-138970 A | 5/2004 |
| JP | 2007-006305 A | 1/2007 |
| JP | 2008-028546 A | 2/2008 |
| JP | 2009-147839 A | 7/2009 |
| JP | 2009-175254 A | 8/2009 |

* cited by examiner

Primary Examiner — Twyler Haskins
Assistant Examiner — Dwight C Tejano
(74) Attorney, Agent, or Firm — Canon USA, Inc. IP Division

(57) ABSTRACT

When automatic exposure (AE) for AF is performed, an imaging apparatus sets a fastest speed or a predetermined fixed speed as a diaphragm driving speed to reduce the time to be spent for the AF. On the other hand, when an interchangeable lens in which the diaphragm driving speed can be changed is attached to the imaging apparatus, and AE is performed for moving image recording, the imaging apparatus slows down the diaphragm blade driving speed compared to the speed at the time of AE for AF in consideration of the quality of moving image recording and display.

24 Claims, 11 Drawing Sheets

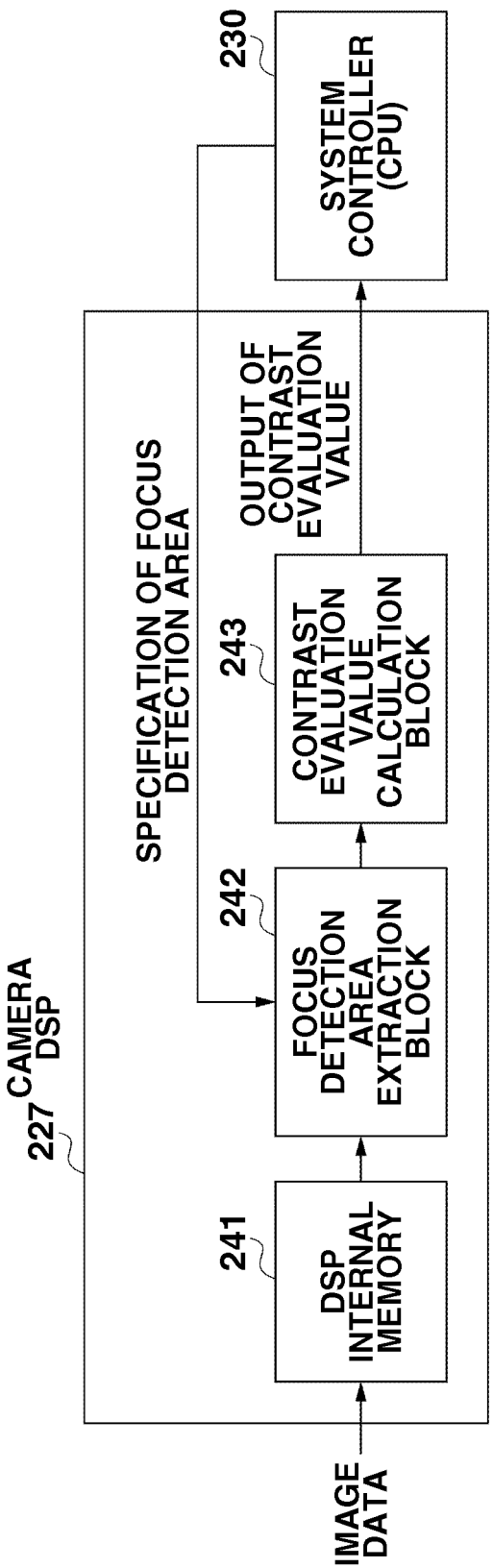

IMAGING APPARATUS HAVING AN ATTACHED INTERCHANGEABLE LENS

BACKGROUND OF THE INVENTION

1. Field of the Invention

The present invention relates to an interchangeable lens type imaging apparatus, and in particular, to an imaging apparatus to which a lens apparatus provided with a diaphragm for adjusting an amount of incident light is detachably attached.

2. Description of the Related Art

Conventionally, at the time of execution of focus detection by the contrast evaluation method in which a focus is detected based on contrast of an object image (i.e., contrast automatic focus (AF)), an exposure amount adjustment is performed in a manner suitable for the focus detection area prior to the AF to achieve an appropriate exposure amount in the focus detection area in the imaging plane. For example, Japanese Patent Application Laid-Open No. 2004-138970 discusses a relevant technique.

For example, when contrast AF is performed on an object in a backlight condition, execution of the exposure amount adjustment discussed in Japanese Patent Application Laid-Open No. 2004-138970 enables a further enhancement of the contrast of the object on which the focus detection is performed, thereby facilitating the focus detection.

Further, as a diaphragm constituted by a stepping motor and controlling an amount of incident light to an imaging optical system, conventionally, there is known a diaphragm device capable of finely controlling the aperture control speed of the diaphragm, as discussed in, for example, Japanese Patent Application Laid-Open No. 6-88985.

As discussed in Japanese Patent Application Laid-Open No. 6-88985, the control speed of the diaphragm aperture can be finely controlled by selectively switching a waveform of voltage to be applied to the stepping motor between rectangular waves and micro-step waves.

Conventionally, interchangeable lens type digital single lens reflex cameras used to be able to shoot only still images. Recently, however, there has been provided this type of camera that can shoot moving images as well.

Regarding the quality how an exposure amount is changed, it is desirable to maintain continuity of captured images to a certain degree by making a gradual change in the exposure amount in adjustment of it according to a change in the light amount of an object during moving image recording. However, in an exposure amount adjustment for focus detection, gradually changing the exposure amount to an appropriate exposure amount prolongs the time until a start of the AF, thereby prolonging the time until completion of the AF.

When an object image is displayed at an electronic viewfinder for the purpose of determining a composition at a stage before moving image recording (hereinafter referred to as "at the time of standby for moving image recording"), this is often accompanied by a composition change such as quick panning and a zoom adjustment, and, therefore, requires a certain level of followability of an exposure amount. In spite of this need, if an exposure amount is gradually adjusted at the time of standby for moving image recording because this occasion is handled as a kind of moving image recording, the followability of the exposure amount when a composition is changed is reduced.

On the other hand, a rapid change in the diaphragm aperture when the exposure amount is adjusted causes a rapid change in the depth of filed. Therefore, if the diaphragm aperture is suddenly changed when the exposure amount is adjusted during moving image recording, the continuity of the captured images is interrupted, resulting in deterioration of the image quality.

Despite commercialization of a digital single lens reflex camera that can record not only still images but also moving images, an attachable interchangeable lens therefor is designed for still image shooting. Therefore, in a conventional interchangeable lens, it is impossible to finely control the speed of controlling the aperture of the mounted diaphragm.

SUMMARY OF THE INVENTION

The present invention is directed to an imaging apparatus capable of optimizing the followability of an exposure amount adjustment according to the states of a camera at the time of moving image recording, at the time of standby for moving image recording, and at the time of focus detection.

According to an aspect of the present invention, an imaging apparatus, to which a lens apparatus provided with a diaphragm for adjusting an amount of incident light is detachably attachable, includes an imaging unit configured to generate an image signal by photoelectrically converting an object image, an exposure control unit configured to switch between a first control operation for maintaining a fixed diaphragm driving speed and a second control operation for enabling variation of a diaphragm driving speed, according to a type of the attached lens apparatus, and a focus detection unit configured to detect a focusing state of the attached lens apparatus. The exposure control unit controls the diaphragm driving speed according to an output from the imaging unit during the second control operation to maintain such a relationship that the diaphragm driving speed when the image signal for a moving image is generated is slower than the diaphragm driving speed for detection of the focusing state by the focus detection unit.

According to another aspect of the present invention, an imaging apparatus, to which a lens apparatus provided with a diaphragm for adjusting an amount of incident light is detachably attachable, includes an imaging unit configured to generate an image signal by photoelectrically converting an object image, an exposure control unit configured to switch between a first control operation for maintaining a fixed diaphragm driving speed and a second control operation for enabling variation of a diaphragm driving speed according to a type of the attached lens apparatus, and a focus detection unit configured to detect a focusing state of the attached lens apparatus. The focus detection unit includes a plurality of different focus detection modes. The exposure control unit controls the diaphragm driving speed according to an output from the imaging unit and the focus detection mode of the focus detection unit during the second control operation.

According to exemplary embodiments of the present invention, it is possible to provide an imaging apparatus, to which a lens apparatus provided with a diaphragm for adjusting an amount of incident light is detachably attached, capable of optimizing the followability of an exposure amount adjustment according to the states of a camera at the time of moving image recording, at the time of standby for moving image recording, and at the time of focus detection.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a block diagram illustrating a contrast evaluation value calculation circuit.

DESCRIPTION OF THE EMBODIMENTS

Various exemplary embodiments, features, and aspects of the invention will be described in detail below with reference to the drawings.

Figure 1:
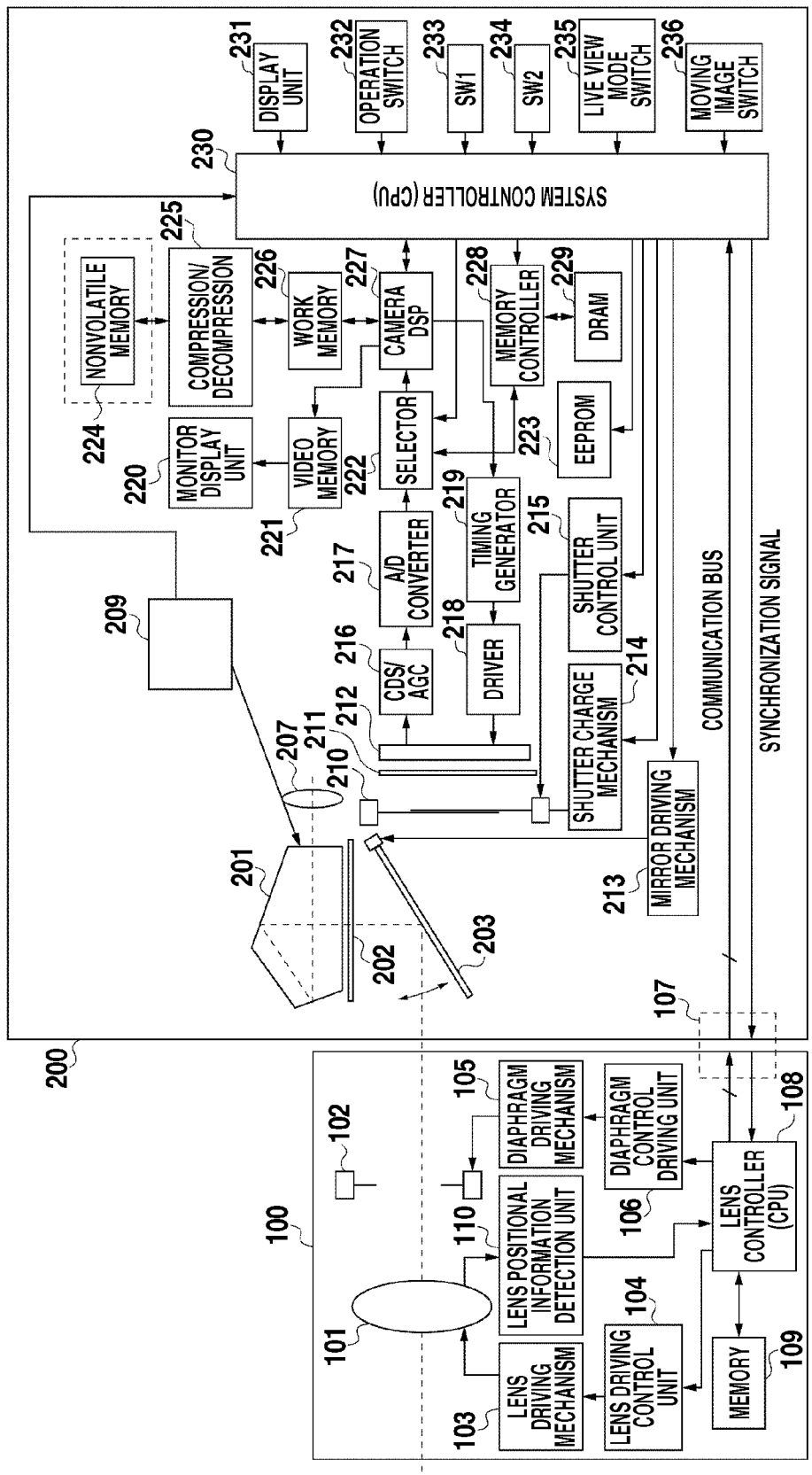
FIG. 1 is a block diagram illustrating a configuration of a digital camera according to an exemplary embodiment of the present invention.

FIG. 1 is a block diagram illustrating a configuration of a digital camera according to a first exemplary embodiment of the present invention.

As illustrated in FIG. 1, a photographic lens 100 is detachably attached to a digital camera 200 via a lens attachment mechanism of a not-shown mount portion. An electrical contact unit 107 is disposed at the mount portion. The electrical contact unit 107 includes a terminal for a communication bus line which is constituted by, for example, a communication clock line, a data transfer line, and a data reception line. These lines enable communication between the digital camera 100 and the photographic lens 100. The digital camera 200 communicates with the photographic lens 100 via the electrical contact unit 107, and controls driving of a focus lens 101 and a diaphragm 102 which adjusts an amount of incident light in the photographic lens 100. Although FIG. 1 illustrates only the focus lens 101 as a lens in the photographic lens 100, actually, a variable power lens and a stationary lens are also disposed in addition to the photographic lens 100, and the lens unit is constituted by including these lenses. Further, a plurality of types of photographic lenses 100 can be attached to the digital camera 200. Examples of those lenses include a photographic lens in which the diaphragm driving speed (speed of the diaphragm per step) can be set to be variable, and a photographic lens in which the diaphragm driving speed is fixed. Further, in the case of the photographic lens in which the diaphragm driving speed can be changed, it is possible to perform a control operation of maintaining a constant diaphragm driving speed, and a control operation of enabling variation of the diaphragm driving speed according to a situation.

Further, the electrical contact unit 107 includes the communication bus line, and a synchronization single line for transmission of electric charge accumulation timing of an image signal from the camera side to the lens side.

Light flux from a not-shown object is guided to a quick return mirror 203 in the digital camera 200 via the lens unit including the focus lens 101, and the diaphragm 102 in the photographic lens 100. The quick return mirror 203 is disposed so as to be inclined relative to an optical axis in a photographic optical path. The quick return mirror 203 is movable by being driven upward and downward by a mirror driving mechanism 213 between a first position (the position illustrated in FIG. 1) where the mirror 203 guides light flux from an object to a finder optical system disposed at the upper side, and a second position where the mirror 203 is retracted to the outside of the photographic optical path. The light flux reflected by the quick return mirror 203 reaches an eye of a user via the finder optical system constituted by a finder screen 202, a pentagonal prism 201, and an eyepiece lens 207, which exist on a focus plane.

When the quick return mirror 203 is moved upward to the second position, light flux from the photographic lens 100 reaches an image sensor 212 via a focal plane shutter 210, which is a mechanical shutter, and an optical filter 211. The optical filter 211 has the function of filtering out infrared ray and guiding only visible ray to the image sensor 212, and the function as an optical low-pass filter.

Further, the focal plane shutter 210 includes a first curtain and a second curtain, and controls transmission and cutoff of light flux from the photographic lens 100.

Further, the digital camera 200 includes a system controller 230 in charge of overall control. The system controller 230 is constituted by, for example, a central processing unit (CPU) and a micro processing unit (MPU), and controls operations of circuits which will be described later.

The system controller 230 communicates with a lens controller 108 in the photographic lens 100 via the electrical contact unit 107 with use of the communication bus line.

Similarly to the system controller 230, the lens controller 108 is also constituted by, for example, a CPU and an MPU, and controls operations of circuits in the photographic lens 100.

Communication between the system controller 230 and the lens controller 108 includes transmission of a driving command, a discontinuance command, a driving amount, and a requested driving speed of the focus lens 101 in the photographic lens 100 from the system controller 230. Further, the system controller 230 also transmits a driving amount and a driving speed of the diaphragm 102, and a transmission request for various data of the lens side.

At the time of focus driving, the system controller 230 instructs the lens controller 108 as to a driving direction, a driving amount, and a driving speed of the lens through communication therebetween.

Upon reception of a lens driving command from the system controller 230, the lens controller 108 controls, via a lens driving control unit 104, a lens driving mechanism 103, which performs focus control by driving the focus lens 101 in the optical axis direction. The lens driving mechanism 103 includes a stepping motor as a driving source.

Upon reception of a diaphragm control command from the system controller 230, the lens controller 108 controls a diaphragm driving mechanism 105 in charge of driving the diaphragm 102 via the diaphragm control driving unit 106 to control the diaphragm 102 to a specified value. The diaphragm driving mechanism 105 is controlled by the diaphragm control driving unit 106 applying as a driving voltage a conventionally used waveform in the form of rectangular waves or a micro-step waveform in the form of sine waves.

Figure 3A:
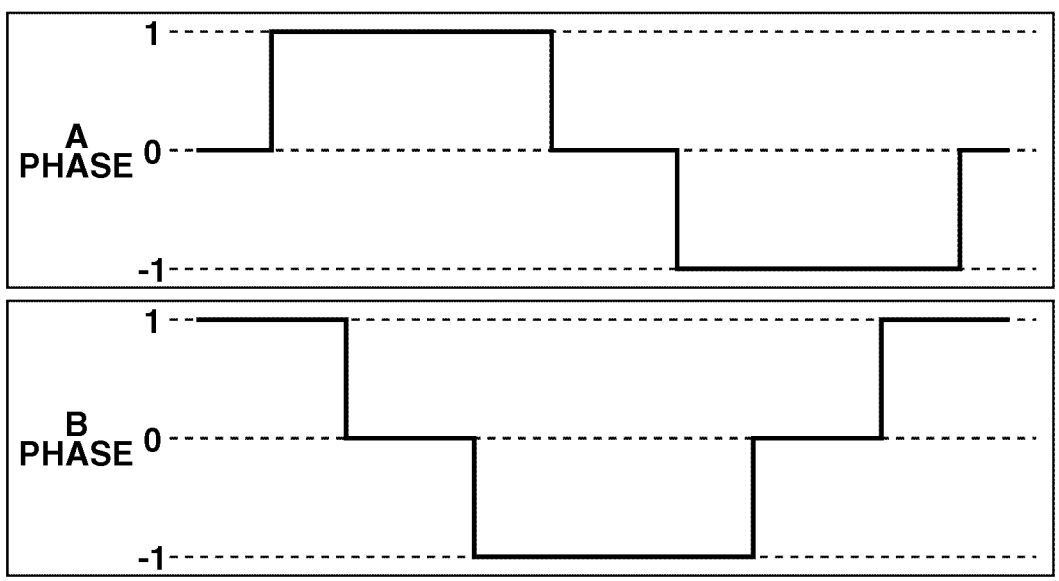
FIGS. 3A and 3B are graphs illustrating driving voltages for diaphragm control.
Figure 3B:
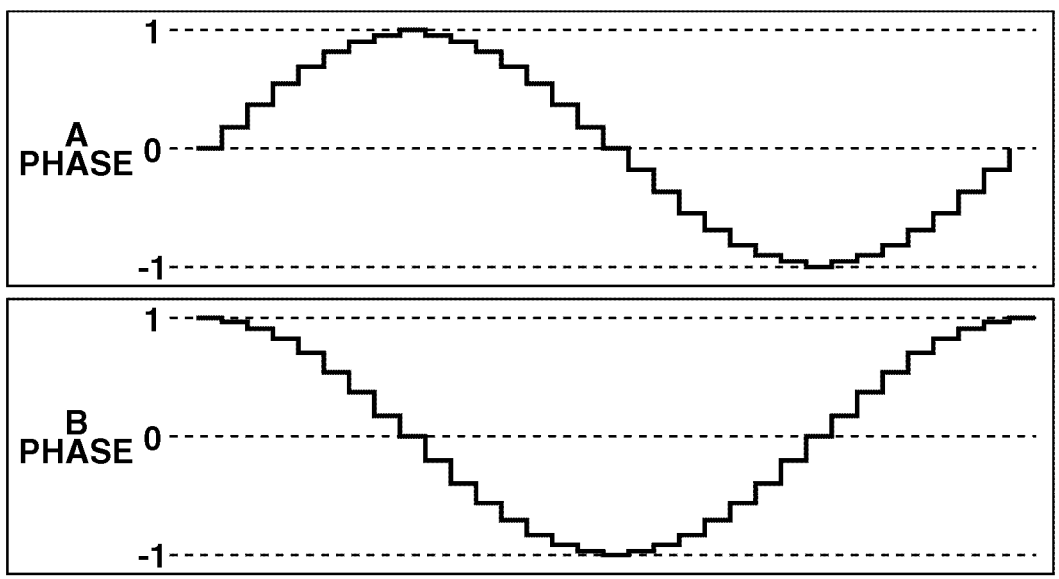

FIGS. 3A and 3B are graphs illustrating driving voltages for diaphragm driving. In particular, FIG. 3A is a graph of the conventionally used waveform based on one-two phase driving, and FIG. 3B is a graph of the micro-step waveform.

Further, the system controller 230 is also connected to a shutter control unit 215 and a light metering unit 209. The shutter control unit 215 controls travel driving of the first curtain and second curtain of the focal plane shutter 210 in response to a signal from the system controller 230. Further, the driving source of the first curtain and the second curtain of the focal plane shutter 210 is constituted by a spring. Therefore, after the shutter travels, a spring charge is required for the next operation. A shutter charge mechanism 214 performs this spring charge. Further, the system controller 230 stores a program diagram defining an exposure control program for an electric charge accumulation time of the image sensor 212, exposure sensitivity, and a diaphragm value, which are set based on an exposure amount obtained from an output of a predetermined light metering area at the light metering unit 209 or the image sensor 212.

Further, the system controller 230 controls the lens driving mechanism 103 via the lens driving control unit 104 by transmitting a lens driving command to the lens controller 108. Due to this control, an object image is formed on the image sensor 212.

Further, a camera digital signal processor (DSP) 227 contains a circuit block which calculates a contrast evaluation value for use in contrast AF, and a circuit block which determines a position and a size of an area for which a contrast evaluation value is calculated. As these circuit blocks will be described in detail later, the contrast evaluation value mentioned here is a value indicating a focusing state of the optical system including the focus lens 101.

An analog/digital (A/D) converter 217 is connected to the camera DSP 227 via a timing generator 219 and a selector 222. Further, a work memory 226 is also connected to the camera DSP 227.

The image sensor 212 is controlled by an output from a driver 218, which controls horizontal driving and vertical driving per pixel based on a signal from the timing generator 219, which determines overall driving timing. Under this control, the image sensor 212 generates and outputs an image signal by photoelectrically converting an object image. An image signal generated by the image sensor 212 is amplified at a correlated double sampling/automatic gain control (CDS/AGC) circuit 216, and is converted into a digital signal by the A/D converter 217. In the digital camera 200, the imaging frame rate of the image sensor 212 is set by an operation input through an operation switch 232, based on which a signal output from the timing generator 219 is converted. This realizes control of the imaging frame rate of the image sensor 212 according to the above-mentioned setting. The imaging frame rate may be changed according to a plurality of shooting modes including the moving image shooting mode for generating an image signal for a moving image and the still image shooting mode for generating an image signal for a still image.

An output from the A/D converter 217 is input into a memory controller 228 via the selector 222, which selects a signal based on a signal from the system controller 230. All outputs from the A/D converter 217 are transferred to a dynamic random access memory (DRAM) 229, which serves as a frame memory.

In a video camera and a compact digital camera in a pre-shooting state, this transfer result is regularly (per frame) transferred to a video memory 221, thereby enabling, for example, a finder display (live view) with use of a monitor display unit 220. On the other hand, in a digital single lens reflex camera in a pre-shooting state, normally, the image sensor 212 is shielded from light by the quick return mirror 203 and the focal plane shutter 210, so that alive view display is unavailable.

In this regard, a live view operation becomes possible by lifting the quick return mirror 203 to retract it from the photographic optical path, and then by opening the focal plane shutter 210. Further, processing an image signal from the image sensor 212 by the camera DSP 227 or the system controller 230 during a live view enables acquisition of a contrast evaluation value indicating the focusing state of the optical system including the focus lens 101. Then, it becomes possible to perform focus detection based on the contrast evaluation method with use of the evaluation value.

During shooting, data of each pixel corresponding one frame is read from the DRAM 229 according to a control signal from the system controller 230, and image processing is applied thereto by the camera DSP 227. After that, the data is tentatively stored in the work memory 226. Then, the data in the work memory 226 is compressed at a compression/decompression circuit 225 based on a predetermined compression format, a result of which is stored in an external nonvolatile memory 224. Normally, the nonvolatile memory 224 is embodied by a nonvolatile memory such as a flash memory. Alternatively, the nonvolatile memory 224 may be embodied by a hard disk or a magnetic disk.

Further, a display unit 231 connected to the system controller 230 shows an operation status of the camera set or selected through switches which will be described below, with use of a display element such as a liquid crystal element, a light-emitting diode (LED), or an organic electroluminescence (EL).

The operation switch 232 is an operation member through which an operation input is provided with respect to various setting items of the digital camera 200. A release switch SW1 (233) is a switch for starting a shooting preparation operation such as light metering and focus detection. A release switch SW2 (234) is a switch for starting a shooting operation (electric charge accumulation and electric charge readout operation for acquiring a still image). A live view mode switch 235 is a switch for ON/OFF control of live view display. A moving image switch 236 is a switch for starting a continuous shooting operation (repeat of electric charge accumulation and electric charge readout operations for acquiring a moving image).

On the other hand, in the photographic lens 100 as the lens unit, the lens controller 108 is provided with a memory 109. The memory 109 stores performance information such as the focus length, the full-aperture value, the settable diaphragm driving speed information of the photographic lens 100, and lens identification (ID) information which is unique information for identifying the photographic lens 100.

The performance information and the lens ID information are transmitted to the system controller 230 through initial communication when the photographic lens 100 is attached to the digital camera 200, and the system controller 230 saves the information in an electrically erasable programmable read-only memory (EEPROM) 223.

Further, the photographic lens 100 includes a lens positional information detection unit 110 for detecting positional information of the focus lens 101. The lens positional information detected by the lens positional information detection unit 110 is read by the lens controller 108. The lens positional information is used for driving control of the focus lens 101, and is transmitted to the system controller 230 via the electrical contact unit 107.

The lens positional information detection unit 101 is constituted by, for example, a pulse encoder which detects the number of rotational pulses of a motor constituting the lens driving mechanism 103. The output thereof is connected to a not-shown hardware counter in the lens controller 108, and the positional information is mechanically counted when the lens is driven. When the lens controller 108 reads the lens positional information, the lens controller 108 accesses a register of the internal hardware counter, and reads the stored count value.

Next, a contrast evaluation value calculation circuit block of the camera DSP 227 will be described with reference to FIG. 2.

FIG. 2 is a block diagram illustrating the circuit block in the camera DSP 227.

An image signal generated by the image sensor 212 is amplified at the CDS/AGC circuit 216, and is converted into a digital signal by the A/D converter 217 as mentioned above. The digitized image data is input to the camera DSP 227 via the selector 222.

Image data input into the camera DSP 227 is first input into a focus detection area extraction block 242 via a DSP internal memory 241 in the camera DSP 227 to calculate a contrast evaluation value for use in contrast AF. The focus detection area extraction block 242 is a block for trimming an image of a focus detection area and the vicinity thereof from image data of a whole screen and transmitting it to a contrast evaluation value calculation block 243, which is a next block. Desirably, the size of a focus detection area is approximately one-fifth to one-tenth relative to an outer frame of a screen. The digital camera 200 is configured such that a position and size of a focus detection area in a screen can be set by the system controller 230 to the focus detection area extraction block 242. The contrast evaluation value calculation block 243 is a block for extracting a predetermined frequency component from an image of a focus detection area and the vicinity thereof by digital filter calculation, and transmitting it to the system controller 230 as a contrast evaluation value.

Next, an operation of the present exemplary embodiment will be described with reference to the flowchart of FIG. 4. The control which will be described below is performed by the control of the system controller 230, unless otherwise indicated. It is assumed that an image is acquired by the image sensor 212 according to a predetermined frame rate when this live view request is issued.

First, the processing is started when the digital camera 200 enters such a state that the exposure amount is constantly adjusted, upon a press of the live view mode switch (235) and a start of a live view display. It is assumed that the digital camera 200 is powered on in advance. The term "live view display" refers to displaying a moving image by displaying an acquired image on the monitor display unit 220 as needed, and includes all of such display events regardless of whether the moving image is being recorded or is only displayed without being recorded. The operation switch 232 may be pressed instead of the live view mode switch (235).

First, in step S401, the system controller 230 determines whether a contrast AF request is issued through an operation input to the SW1 (233). If a contrast AF request is issued (YES in step S401), the processing proceeds to step S402, where the system controller 230 performs an exposure amount adjustment directed to the image area for which the contrast is evaluated. If a contrast AF request is not issued (NO in step S401), the processing proceeds to step S404, where the system controller 230 selects another exposure amount adjustment operation.

In step S402, the system controller 230 sets the light metering area in such a manner that the light metering area substantially identically corresponds to the contrast evaluation area to perform an exposure amount adjustment directed to the image area for which the contrast is evaluated. The system controller 230 performs known and commonly-practiced light metering calculation based on an imaging output of the thus-set light metering area, and calculates a difference between the current exposure amount and the target exposure amount. After the calculation, the system controller 230 determines various settings including a diaphragm change amount when the exposure amount is adjusted, an electric charge accumulation time of the image sensor 212, and exposure sensitivity based on the program diagram stored in the system controller 230. After the determination, the processing proceeds to step S419. In step S419, the system controller 230 determines, from the performance information acquired through communication with the photographic lens 100, whether the photographic lens 100 attached to the digital camera 200 is a lens in which the diaphragm driving speed can be changed. If the system controller 230 detects that the performance information contains the settable diaphragm driving speed information and determines that the photographic lens 100 is a compliant lens in which the diaphragm driving speed can be changed (YES in step S419), the processing proceeds to step S403. If the photographic lens 100 is a noncompliant lens in which the diaphragm driving speed cannot be changed (NO in step S419), the processing proceeds to step S420.

In step S403, for the diaphragm driving speed to be controlled in the exposure amount adjustment, the system controller 230 sets a fast first speed as the diaphragm driving speed to quickly control the diaphragm, and notifies the lens controller 108 of this setting through the electrical contact unit 107. The lens controller 108 receives a notification about the setting of the diaphragm driving speed, and issues an instruction of the diaphragm driving speed to the diaphragm control driving unit 106, so that the set diaphragm driving speed can be realized. After the setting of the diaphragm driving speed, the processing proceeds to step S406. For example, the first speed, the diaphragm driving speed setting of which is fast, is a high driving speed which takes only a time equal to or less than a time spent to acquire an image corresponding to one frame.

On the other hand, in step S404, the system controller 230 performs known and commonly-practiced light metering calculation based on an imaging output of a predetermined light metering area, and calculates a difference between the current exposure amount and the target exposure amount. After the calculation, the system controller 230 determines various settings including a diaphragm change amount when the exposure amount is adjusted, an electric charge accumulation time of the image sensor 212, and exposure sensitivity based on the program diagram stored in the system controller 230. After the determination, the processing proceeds to step S405.

In step S405, the system controller 230 determines, from the performance information acquired through initial communication when the photographic lens 100 is attached to the digital camera 200, whether the photographic lens 100 attached to the digital camera 200 is a lens in which the diaphragm driving speed can be changed. If the system controller 230 detects that the performance information contains the settable diaphragm driving speed information and determines that the photographic lens 100 is a compliant lens in which the diaphragm driving speed can be changed (YES in step S405), the processing proceeds to step S411. If the photographic lens 100 is a noncompliant lens in which the diaphragm driving speed cannot be changed (NO in step S405), the processing proceeds to step S420. In step S420, the system controller 230 sets a fixed speed as the setting of the diaphragm driving speed for the lens determined in step S419 or S405 as a lens in which the diaphragm driving speed cannot be changed. After the setting of the diaphragm driving speed, the processing proceeds to step S406.

In step S406, the system controller 230 notifies the shutter control unit 215 of the electric charge accumulation time determined in step S402 or S404. The shutter control unit 215 updates the exposure time by the focal plane shutter 210 after the notification, according to the notified electric charge accumulation time. Further, in step S406, the system controller 230 notifies the CDS/AGC 216 of the exposure sensitivity determined in step S402 or S404. The CDS/AGC 216 updates the amplification value for an image signal generated by the image sensor 212, according to the notified exposure sensitivity. After these updates, the processing proceeds to step S407.

In step S407, the diaphragm aperture is controlled at the determined diaphragm driving speed by the diaphragm change amount determined in step S402 or S404. The determined diaphragm driving speed is the first speed set in step S403, or the fixed speed for the lens determined in step S419 or S405 as a lens in which the diaphragm driving speed cannot be changed. After the control of the diaphragm, the processing proceeds to step S408.

In step S408, the system controller 230 determines whether a contrast AF request is issued through an operation input to the switch SW1 (233). If a contrast AF request is issued (YES in step S408), upon completion of the light metering for the AF in which the light metering area corresponds to the contrast evaluation area, the processing proceeds to step S409, where the contrast AF is performed. After the execution of the AF, the processing proceeds to step S410. It is determined again in step S408 after step S401 whether a contrast AF request is issued, because this route includes the case that the photographic lens 100 is determined in step S405 as a noncompliance lens in which the diaphragm driving speed cannot be changed.

In step S410, the system controller 230 determines whether a live view end request is issued through an operation input to the live view mode switch (235). If the live view end request is issued (YES in step S410), the processing according to the present exemplary embodiment ends. If the live view end request is not issued (NO in step S410), since the exposure amount adjustment is continued while the live view is continued, the processing returns to step S401, and the above-mentioned processing according to the present exemplary embodiment is repeated.

In step S411, the system controller 230 determines whether the digital camera 200 is currently recording moving images in response to an operation input to the moving image switch 236. If the digital camera 200 is currently recording moving images (YES in step S411), the processing proceeds to step S412. If the digital camera 200 is not currently recording moving images (NO in step S411), the processing proceeds to step S413.

In step S412, the system controller 230 sets a second speed as the diaphragm driving speed. The second speed is a speed slowed so as to become suitable for moving images. After the setting, the processing proceeds to step S414.

On the other hand, in step S413, the system controller 230 sets a third speed as the diaphragm driving speed. The third speed is slower than the first speed, but faster than the second speed so as to become suitable for a live view. After the setting, the processing proceeds to step S414.

In step S414, the system controller 230 notifies the shutter control unit 215 of the electric charge accumulation time determined in step S404. The shutter control unit 215 updates the exposure time by the focal plane shutter 210 after the notification, according to the notified electric charge accumulation time. Further, in step S414, the system controller 230 notifies the CDS/AGC 216 of the exposure sensitivity determined in step S404. The CDS/AGC 216 updates the amplification value for an image signal generated by the image sensor 212 according to the notified exposure sensitivity. After these updates, the processing proceeds to step S415.

In step S415, the diaphragm aperture is controlled at the determined diaphragm driving speed by the diaphragm change amount determined in step S404. The determined diaphragm driving speed is the second speed set in step S412 or the third speed set in step S413. After the control of the diaphragm, the processing proceeds to step S416.

In step S416, the system controller 230 determines whether the diaphragm driving control performed at the set diaphragm driving speed causes the current exposure amount to reach the target exposure amount. If the current exposure amount reaches the target exposure amount (YES in step S416), the processing proceeds to step S410. If the current exposure amount does not reach the target exposure amount (NO in step S416), the processing proceeds to step S417.

In step S417, the system controller 230 determines whether the diaphragm driving speed is already reduced to a setting lower limit value, in such an exposure amount adjustment that the speed of the change in the exposure amount is getting slower as the current exposure amount is approaching the target exposure amount in consideration of the quality of a live view or moving image recording. If the current exposure amount is reduced to the setting lower limit value (YES in step S417), the processing returns to step S414, so that the diaphragm continues to be controlled to be reduced to the target exposure amount, keeping that speed. If the current exposure amount is not reduced to the setting lower limit value (NO in step S417), the processing proceeds to step S418.

Figure 5A:
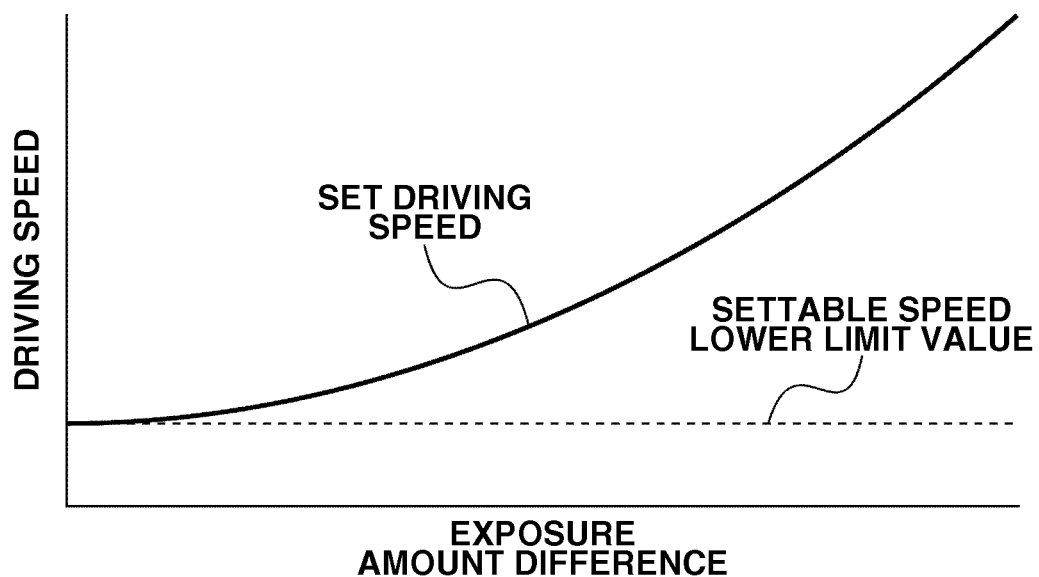
FIGS. 5A and 5B are graphs illustrating an example of control of reducing a diaphragm driving speed.
Figure 5B:
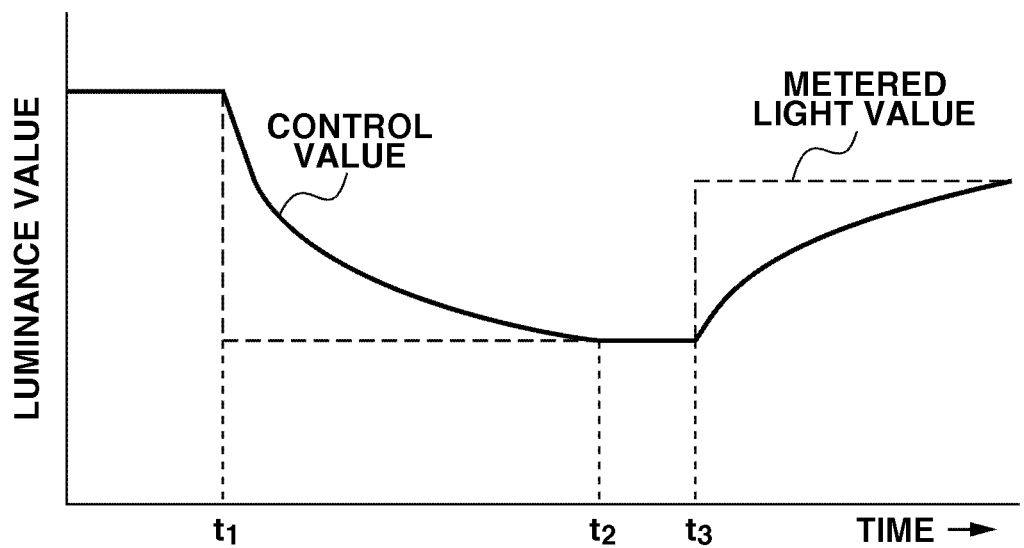

In step S418, the system controller 230 calculates an exposure amount difference between the current exposure amount and the target exposure amount, and reduces the diaphragm driving speed in a stepwise or continuous manner within a settable range according to the exposure amount difference. FIGS. 5A and 5B illustrate an example of reducing the diaphragm driving speed. FIG. 5A is a graph illustrating an example of the setting of the diaphragm driving speed according to the exposure amount difference. FIG. 5B is a graph illustrating the metered light value detected in step S402 or S404, and the control value of the exposure amount that is changing while the diaphragm driving speed is being updated according to the metered light value. In FIG. 5B, the metered light value changes at time $t_1$, which causes the control value of the exposure amount to start changing, and then the control value of the exposure amount catches up with the metered light value at time $t_2$. The metered light value changes again at time $t_3$, which causes the control value of the exposure amount to start changing. As illustrated in the graph of FIG. 5B, as the control value of the exposure amount is approaching the targeted metered light value, the control amount is reduced, as a result which the quality of live view display and the quality of moving image recording can be improved. After the diaphragm driving speed is reduced, the processing returns to step S414 to successively control the diaphragm until the exposure amount reaches the target exposure amount.

Figure 6:
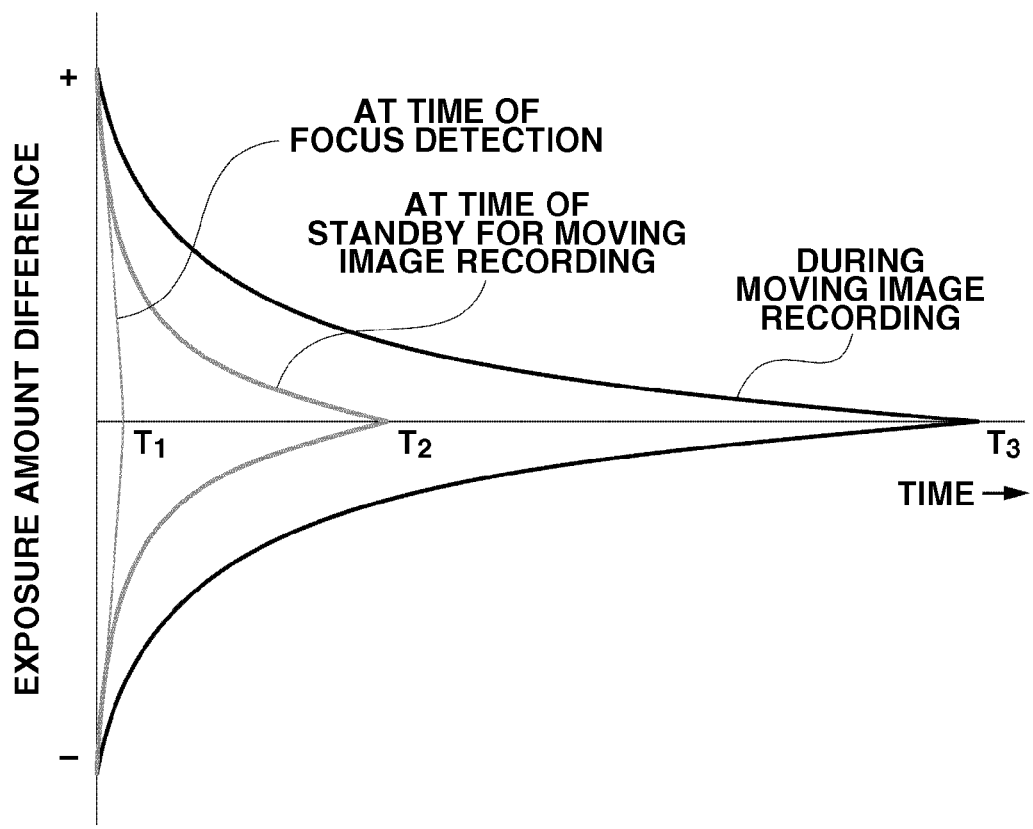
FIG. 6 is a graph for comparing exposure amount control operations in the respective camera states.

FIG. 6 is a graph for comparing the exposure amount control operations in the respective states of the camera at the time of focus detection, during moving image recording, and at the time of standby for moving image recording. In FIG. 6, the vertical axis represents the exposure amount difference from the metered light value, and the horizontal axis represents the elapsed time. Referring to FIG. 6, upon an issuance of a request for an exposure amount adjustment, when the camera performs AF, the diaphragm is driven at the first speed so that the exposure amount is adjusted in time $T_1$ which is the shortest time of all of the camera states. When the camera is recording moving images, the diaphragm driving is started at the second speed slower than the first speed, and then the exposure amount is adjusted, taking time $T_3$ ($>T_1$) while the diaphragm driving speed is gradually reduced. When the camera is in a state of standby for moving image recording, the diaphragm driving is started at the third speed which is slower than the first speed but faster than the second speed, and then the exposure amount is adjusted, taking time $T_2$ ($T_1<T_2<T_3$) while the diaphragm driving speed is gradually reduced. The diaphragm driving speed (the second speed) during moving image recording and the diaphragm driving speed (the third speed) at the time of standby for moving image recording when the exposure amount is adjusted are variable speeds, and the diaphragm driving speed is controlled so that the relationship illustrated in FIG. 6 is maintained as the speed relationship of the diaphragm driving speed, no matter how large or short the exposure amount difference is.

Execution of the above-mentioned operation enables optimizing the followability of an exposure amount adjustment according to the states of the camera at the time of moving image recording, at the time of standby for moving image recording, and at the time of focus detection.

The present exemplary embodiment includes only the contrast AF method as a focus detection unit, and when a contrast AF request is issued in step S401, the fastest first speed is set as the diaphragm driving speed in step S403. However, the present exemplary embodiment is not limited thereto. The present exemplary embodiment may additionally include a focus detection unit employing another method such as the through-the-lens (TTL) phase difference method or the imaging plane phase difference method, and the operation according to the present exemplary embodiment may be performed when the contrast AF is selectively performed, or focus detection is performed by a combination of the contrast AF and another method. Execution of this operation enables reducing the time until completion of focus detection.

Further, in the present exemplary embodiment, when it is determined in step S401 that a contrast AF request is issued, the system controller 230 may temporarily stop updating of data to the DRAM 229 which serves as a frame memory, and may freeze the display of the monitor display unit 220. Further, the display of the monitor display unit 220 may be turned into a black screen or the light of the monitor display unit 220 may be turned off. Alternatively, the data to be written onto the DRAM 229 maybe changed, and information related to still image shooting, such as "PERFORMING EXPOSURE CONTROL FOR STILL IMAGE SHOOTING OR PERFORMING AF PROCESSING" may be displayed. Execution of this operation enables adjusting the exposure amount at the fastest speed without the need for taking the display quality into consideration when a contrast AF request is issued.

Figure 4:
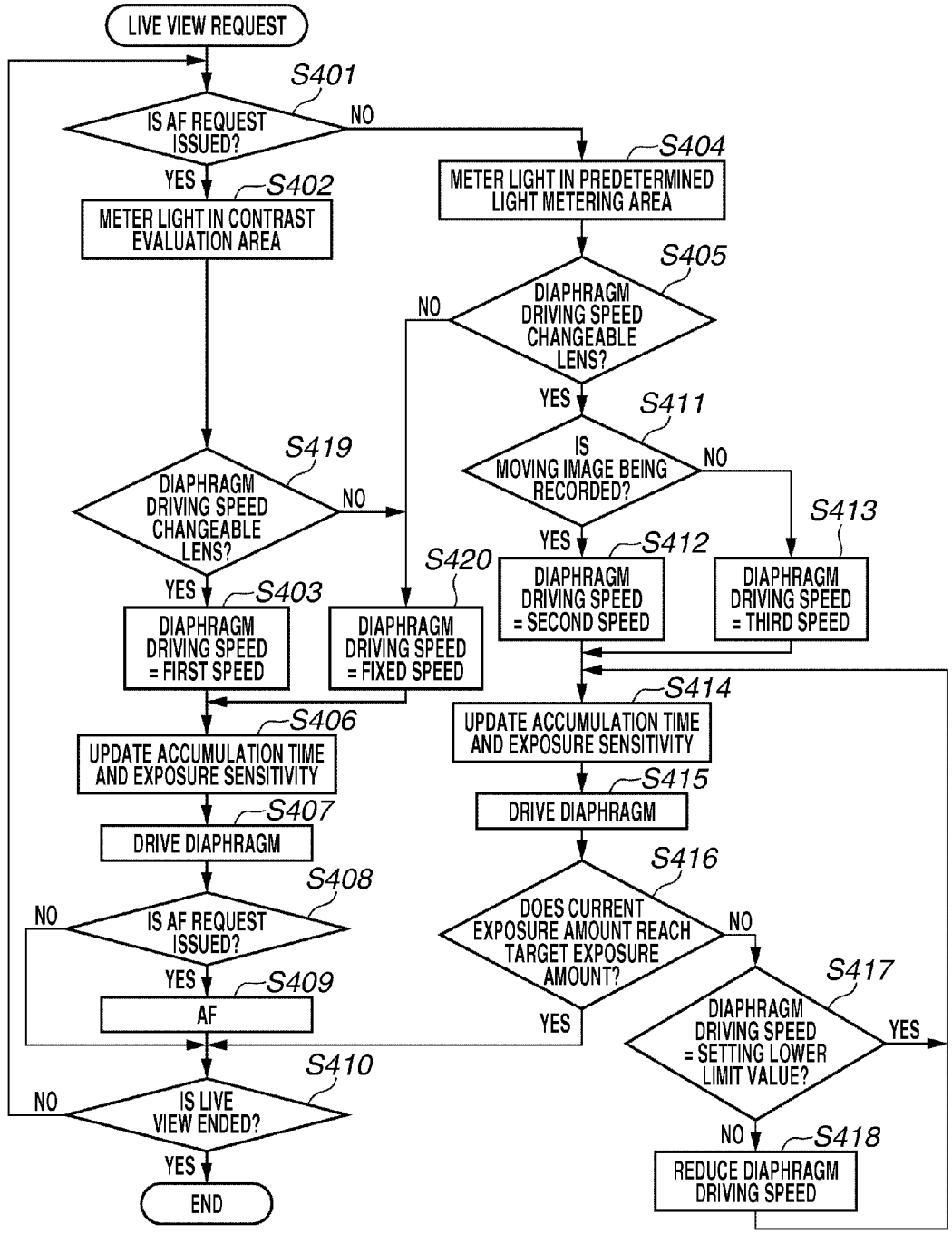
FIG. 4 is a flowchart illustrating an operation according to a first exemplary embodiment of the present invention.

In the first exemplary embodiment, when a contrast AF request is issued in step S401 in FIG. 4, the fast first speed is always set as the diaphragm driving speed in step S403. However, the present invention is not limited thereto, and may be configured such that a menu screen can be displayed on the monitor display unit 220 or the display unit 231, and whether the above-mentioned first speed is set when a contrast AF request is issued can be selected by operating the menu with an operation input through the operation switch 232. In the following, a second exemplary embodiment of the present invention will be described.

Figure 7:
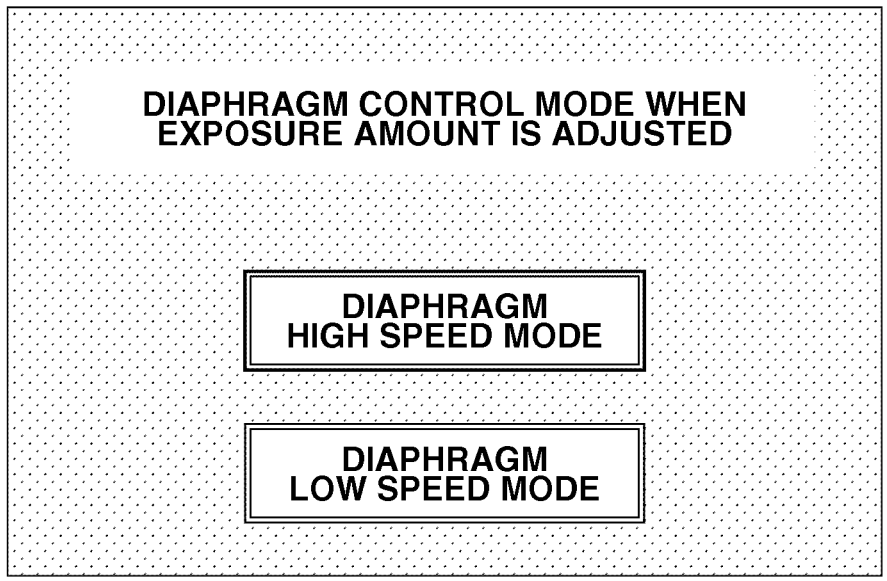
FIG. 7 illustrates an example of a menu screen where an operation input is provided with respect to a diaphragm control mode.

The digital camera according to the present exemplary embodiment has a configuration similar to the configuration discussed in the description of the first exemplary embodiment with reference to FIG. 1. A difference therebetween is that, in the digital camera of the second exemplary embodiment, a user can exclusively select a diaphragm high speed mode for controlling the diaphragm control at the fast first speed, or a diaphragm low speed mode for controlling the diaphragm control at a speed slower than the first speed, through the above-mentioned menu operation. FIG. 7 illustrates the monitor display unit 220 displaying a screen enabling a selection of the diaphragm high speed mode (upper option) for controlling the diaphragm at the fast first speed or the diaphragm low speed mode (lower option) for controlling the diaphragm control at a speed slower than the first speed, as the diaphragm control mode when the exposure amount is adjusted. In FIG. 7, the upper diaphragm high speed mode is selected.

Figure 8:
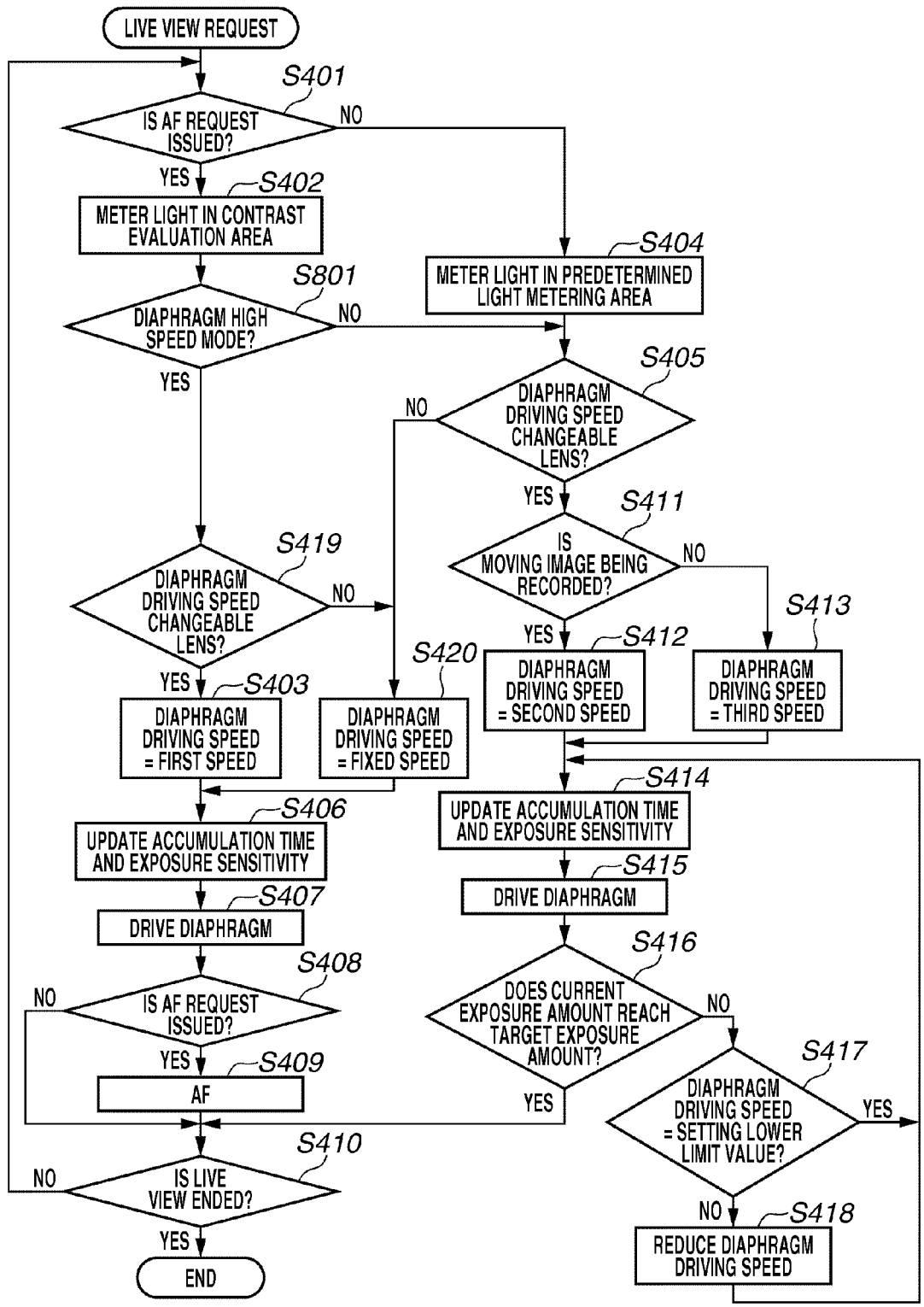
FIG. 8 is a flowchart illustrating an operation according to a second exemplary embodiment of the present invention.

FIG. 8 is a flowchart illustrating the operation according to the present exemplary embodiment. The control which will be described below is performed by the control of the system controller 230, unless otherwise indicated. Like operation steps are denoted by like reference numerals as in the first exemplary embodiment illustrated in FIG. 4. A difference from operation of the first exemplary embodiment is that, after the system controller 230 performs in step S402 the exposure amount adjustment directed to the image area for which the contrast is evaluated, the processing proceeds to step S801, where the system controller 230 determines whether a menu operation selects the diaphragm high speed mode for performing the diaphragm control at the fast first speed.

In step S801, if the diaphragm high speed mode is selected (YES in step S801), the processing proceeds to step S419. If the diaphragm high speed mode is not selected (NO in step S801), the processing proceeds to step S405.

Execution of this operation enables selecting whether the operation of the present exemplary embodiment is applied according to a user's preference.

Figure 9:
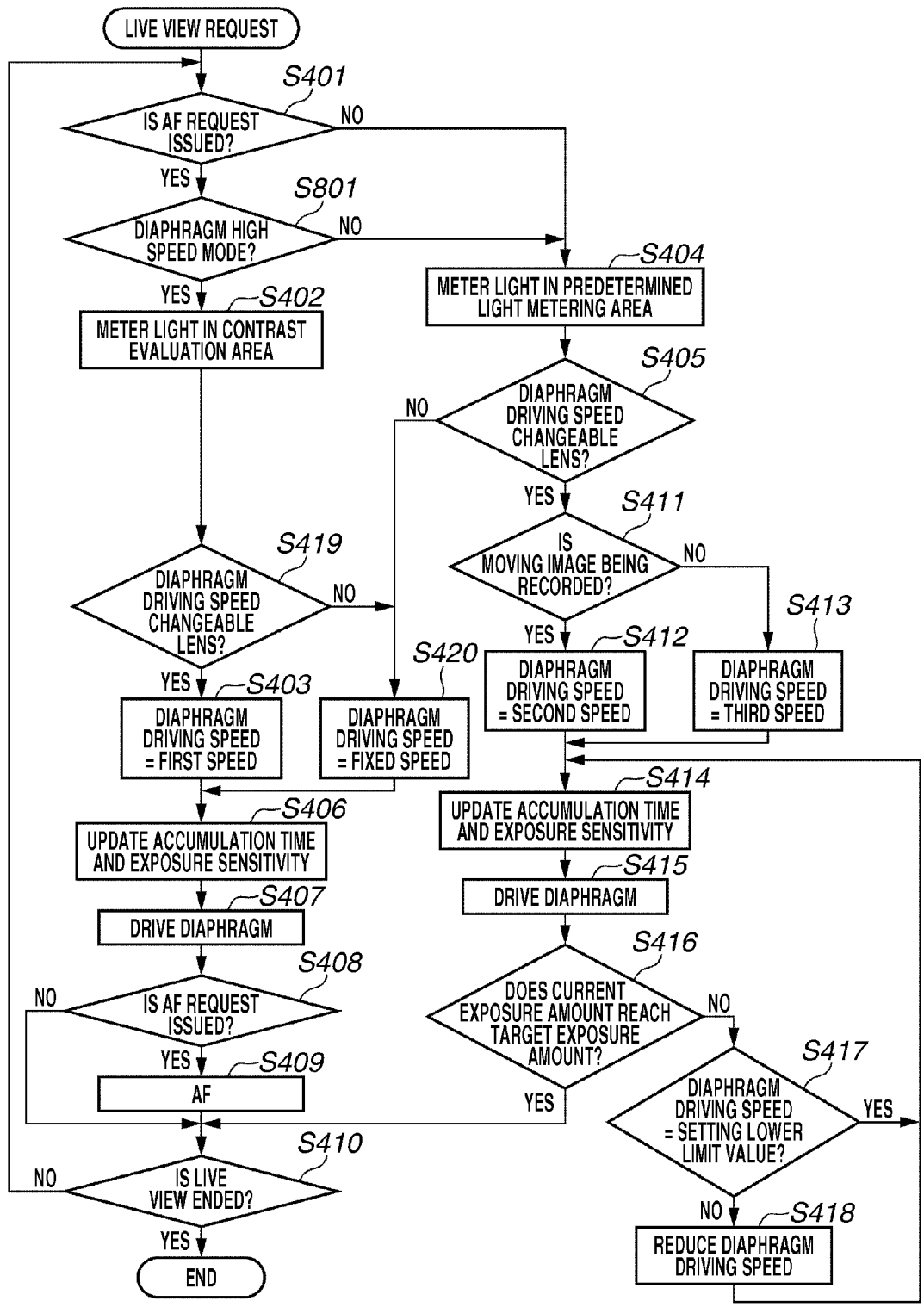
FIG. 9 is a flowchart illustrating an operation according to a variation of the second exemplary embodiment of the present invention.

In the present exemplary embodiment, in step S402, the system controller 230 sets the light metering area in such a manner that the light metering area substantially identically corresponds to the contrast evaluation area to perform the exposure amount adjustment directed to the image area for which the contrast is evaluated. However, the present exemplary embodiment is not limited thereto. As illustrated in the flowchart of FIG. 9, the operation order may be reversed between step S402 and S801, so that a predetermined exposure amount range is set as the light metering area and the exposure amount adjustment operation for the contrast AF is never performed if the diaphragm high speed mode is not selected.

Execution of this operation enables clearly selecting whether the exposure amount adjustment at the time of focus detection is performed, or the exposure amount adjustment during moving image recording or at the time of standby for moving image recording is performed, by a selection of the diaphragm control mode with a menu operation.

In the first exemplary embodiment, the diaphragm driving speed is gradually reduced from the third speed during a live view display without recording moving images. However, the present invention is not limited thereto. When the release switch SW2 (234) is operated and a still image shooting request is issued, the fast first speed may be set as the diaphragm driving speed. In the following, a third exemplary embodiment of the present invention will be described.

The digital camera according to the present exemplary embodiment has a configuration similar to the configuration discussed in the description of the first exemplary embodiment with reference to FIG. 1, and the digital camera according to the present exemplary embodiment includes the diaphragm high speed mode for controlling the diaphragm control at the fast first speed and the diaphragm low speed mode for controlling the diaphragm control at a speed slower than the first speed. A difference between the third exemplary embodiment and the first exemplary embodiment is that the digital camera according to the third exemplary embodiment is configured so that a menu screen can be displayed on the monitor display unit 220 or the display unit 231, and the diaphragm high speed mode or the diaphragm low speed mode can be exclusively selected when a still image shooting request is issued by an operation of the menu with an operation input through the operation switch 232.

Figure 10:
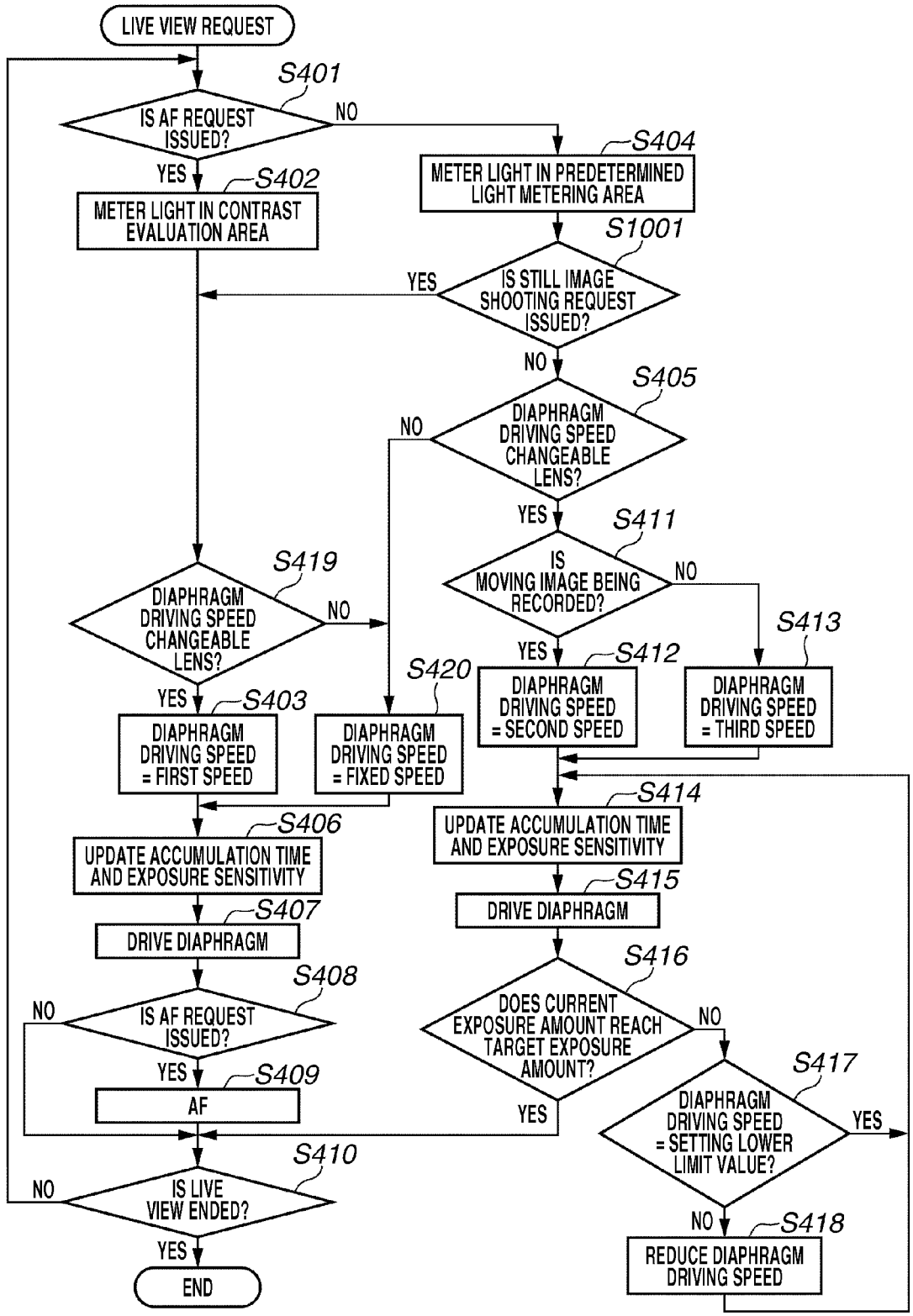
FIG. 10 is a flowchart illustrating an operation according to a third exemplary embodiment of the present invention.

FIG. 10 is a flowchart illustrating the operation according to the present exemplary embodiment. The control which will be described below is performed by the control of the system controller 230, unless otherwise indicated. Like operation steps are denoted by like reference numerals as in the first exemplary embodiment illustrated in FIG. 4. A difference from the operation of the first exemplary embodiment is that, after the system controller 230 performs known and commonly-practiced light metering calculation based on an imaging output of a predetermined light metering area in step S404, the processing proceeds to step S1001, where the system controller 230 determines whether a still image shooting request is issued.

If the system controller 230 determines in step S1001 that the still image shooting request is issued (YES in step S1001), the processing proceeds to step S419. If the still image shooting request is not issued (NO in step S1001), the processing proceeds to step S405. Then, after the contrast AF is performed in step S409, still image shooting is started.

Execution of this operation enables reducing a release time lag of still image shooting.

Further, in the present exemplary embodiment, when a still image shooting request is issued, the system controller 230 may temporarily stop updating of data to the DRAM 229 which serves as a frame memory, and may freeze the display of the monitor display unit 220. Further, the display of the monitor display unit 220 maybe turned into a black screen or the light of the monitor display unit 220 may be turned off. Alternatively, the data to be written onto the DRAM 229 may be changed, and information constituted by a text and/or graphic related to still image shooting may be displayed on the monitor display unit 220. Execution of this operation enables adjusting the exposure amount at the fastest speed without the need for taking the display quality into consideration when a still image shooting request is issued.

In the first exemplary embodiment, only when it is determined in step S408 in FIG. 4 that a contrast AF is issued, the contrast AF is performed in step S409. In other words, this is referred to as a one-shot AF, i.e., a focus detection operation in which, once a focusing state is detected, the lens is not driven for focusing after that. However, the present invention is not limited thereto, and may be applied to a continuous AF, i.e., an operation of constantly adjusting the exposure amount and continuously seeking focus when the camera is in a live view state. In the continuous AF, the camera follows a change in the position of the imaging plane according to a change in the distance to an object to continuously make a correction for a focusing state. Further, in this case, when a contrast AF request is explicitly issued through an operation input to the SW1 (233) while the camera is in alive view state, the one-shot AF may be performed at this time. In this way, if the camera is provided with a plurality of focus detection modes such as the one-shot AF and the continuous AF, the diaphragm control operation may be changed according to them. In the following, a fourth exemplary embodiment of the present invention will be described.

The digital camera according to the present exemplary embodiment had a configuration similar to the configuration discussed in the description of the first exemplary embodiment with reference to FIG. 1.

Figure 11:
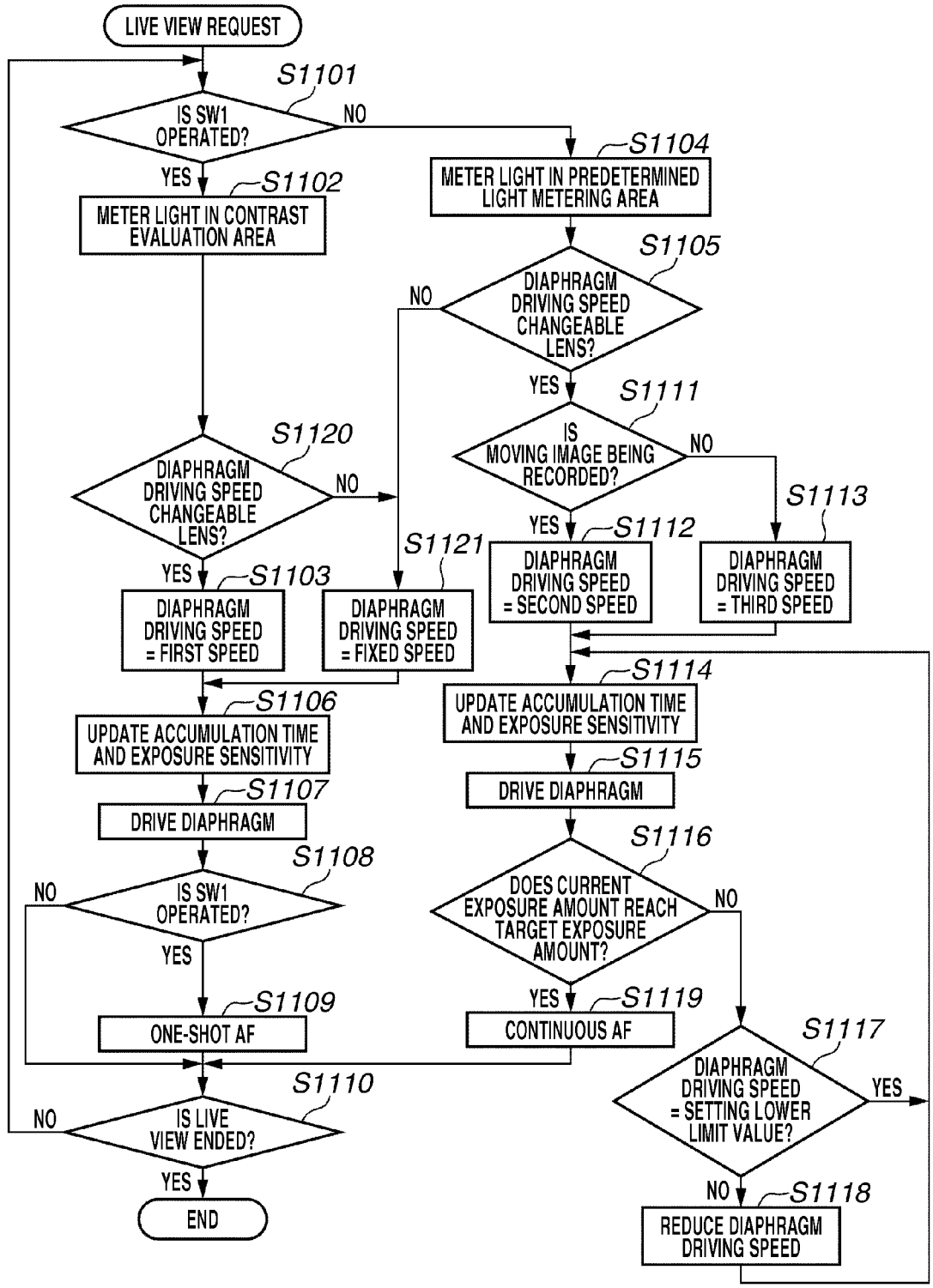
FIG. 11 is a flowchart illustrating an operation according to a fourth exemplary embodiment of the present invention.

FIG. 11 is a flowchart illustrating the operation according to the present exemplary embodiment. The control which will be described below is performed by the control of the system controller 230, unless otherwise indicated. First, the processing is started when the digital camera 200 enters such a state that the exposure amount is constantly adjusted, upon a press of the live view mode switch (235) and a start of a live view display. It is assumed that the digital camera 200 is powered on in advance. The operation switch 232 may be pressed instead of the live view mode switch (235).

First, in step S1101, the system controller 230 determines whether a one-shot AF request is issued through an explicit operation input to the SW1 (233). If the one-shot AF request is issued (YES in step S1101), the processing proceeds to step S1102, where the system controller 230 performs an exposure amount adjustment directed to the image area for which the contrast is evaluated. If the one-shot AF request is not issued (NO in step S1101), the processing proceeds to step S1104, where the system controller 230 selects another exposure amount adjustment operation.

In step S1102, the system controller 230 sets the light metering area in such a manner that the light metering area substantially identically corresponds to the contrast evaluation area to perform an exposure amount adjustment directed to the image area for which the contrast is evaluated. The system controller 230 performs known and commonly-practiced light metering calculation based on an imaging output of the thus-set light metering area, and calculates a difference between the current exposure amount and the target exposure amount. After the calculation, the system controller 230 determines various settings including a diaphragm change amount when the exposure amount is adjusted, an electric charge accumulation time of the image sensor 212, and exposure sensitivity based on the program diagram stored in the system controller 230. After the determination, the processing proceeds to step S1120.

In step S1120, the system controller 230 determines, from the performance information acquired through communication with the photographic lens 100, whether the photographic lens 100 attached to the digital camera 200 is a lens in which the diaphragm driving speed can be changed. If the system controller 230 detects that the performance information contains the settable diaphragm driving speed information and determines that the photographic lens 100 is a compliant lens in which the diaphragm driving speed can be changed (YES in step S1120), the processing proceeds to step S1103. If the photographic lens 100 is a noncompliant lens in which the diaphragm driving speed cannot be changed (NO in step S1120), the processing proceeds to step S1121.

In step S1103, for the diaphragm driving speed to be controlled in the exposure amount adjustment, the system controller 230 sets the fast first speed as the diaphragm driving speed to quickly control the diaphragm, and notifies the lens controller 108 of this setting through the electrical contact unit 107. The lens controller 108 receives a notification about the setting of the diaphragm driving speed, and issues an instruction of the diaphragm driving speed to the diaphragm control driving unit 106, so that the set diaphragm driving speed can be realized. Execution of this operation enables reducing a time lag in the exposure amount adjustment for the one-shot AF. After the setting of the diaphragm driving speed, the processing proceeds to step S1106.

On the other hand, in step S1104, the system controller 230 performs known and commonly-practiced light metering calculation based on an imaging output of a predetermined light metering area, and calculates a difference between the current exposure amount and the target exposure amount. After the calculation, the system controller 230 determines various settings including a diaphragm change amount when the exposure amount is adjusted, an electric charge accumulation time of the image sensor 212, and exposure sensitivity based on the program diagram stored in the system controller 230. After the determination, the processing proceeds to step S1105.

In step S1105, the system controller 230 determines, from the performance information acquired through initial communication when the photographic lens 100 is attached to the digital camera 200, whether the photographic lens 100 attached to the digital camera 200 is a lens in which the diaphragm driving speed can be changed. If the system controller 230 detects that the performance information contains the settable diaphragm driving speed information and determines that the photographic lens 100 is a compliant lens in which the diaphragm driving speed can be changed (YES in step S1105), the processing proceeds to step S1111. If the photographic lens 100 is a noncompliant lens in which the diaphragm driving speed cannot be changed (NO in step S1105), the processing proceeds to step S1121.

In step S1121, the system controller 230 sets a fixed speed as the setting of the diaphragm driving speed for the lens determined in step S1120 or S1105 as a lens in which the diaphragm driving speed cannot be changed. After the setting of the diaphragm driving speed, the processing proceeds to step S1106.

In step S1106, the system controller 230 notifies the shutter control unit 215 of the electric charge accumulation time determined in step S1102 or S1104. The shutter control unit 215 updates the exposure time by the focal plane shutter 210 after the notification, according to the notified electric charge accumulation time. Further, in step S1106, the system controller 230 notifies the CDS/AGC 216 of the exposure sensitivity determined in step S1102 or S1104. The CDS/AGC 216 updates the amplification value for an image signal generated by the image sensor 212, according to the notified exposure sensitivity. After these updates, the processing proceeds to step S1107.

In step S1107, the diaphragm aperture is controlled at the determined diaphragm driving speed by the diaphragm change amount determined in step S1102 or S1104. The determined diaphragm driving speed is the first speed set in step S1103, or the fixed speed for the lens determined in step S1105 as a lens in which the diaphragm driving speed cannot be changed. After the control of the diaphragm, the processing proceeds to step S1108.

In step S1108, the system controller 230 determines whether a one-shot AF request is issued through an explicit operation input to the SW1 (233). If the one-shot AF request is issued (YES in step S 1108), upon completion of the light metering for the AF in which the light metering area corresponds to the contrast evaluation area, the processing proceeds to step S1109.

In step S1109, the system controller 230 performs the one-shot AF of detecting a focus position having the highest contrast while controlling the focus at the fast speed in consideration of an AF time lag regardless of the quality of live view display. After the AF, the processing proceeds to step S1110.

In step S1110, the system controller 230 determines whether a live view end request is issued through an operation input to the live view mode switch (235). If the live view end request is issued (YES in step S1110), the processing according to the present exemplary embodiment ends. If the live view end request is not issued (NO in step S1110), since the exposure amount adjustment and the continuous AF are continued while the live view is continued, the processing returns to step S1101, and the above-mentioned processing according to the present exemplary embodiment is repeated.

On the other hand, in step S1111, the system controller 230 determines whether the digital camera 200 is currently recording moving images in response to an operation input to the moving image switch 236. If the digital camera 200 is currently recording moving images (YES in step S1111), the processing proceeds to step S1112. If the digital camera 200 is not currently recording moving images (NO in step S1111), the processing proceeds to step S1113.

In step S1112, the system controller 230 sets the second speed as the diaphragm driving speed. The second speed is a speed slowed so as to become suitable for moving images. After the setting, the processing proceeds to step S1114.

On the other hand, in step S1113, the system controller 230 sets the third speed as the diaphragm driving speed. The third speed is slower than the first speed, but faster than the second speed so as to become suitable for alive view. After the setting, the processing proceeds to step S1114.

In step S1114, the system controller 230 notifies the shutter control unit 215 of the electric charge accumulation time determined in step S1104. The shutter control unit 215 updates the exposure time by the focal plane shutter 210 after the notification, according to the notified electric charge accumulation time. Further, in step S1114, the system controller 230 notifies the CDS/AGC 216 of the exposure sensitivity determined in step S1104. The CDS/AGC 216 updates the amplification value for an image signal generated by the image sensor 212 according to the notified exposure sensitivity. After these updates, the processing proceeds to step S1115.

In step S1115, the diaphragm aperture is controlled at the determined diaphragm driving speed by the diaphragm change amount determined in step S1104. The determined diaphragm driving speed is the second speed set in step S1112 or the third speed set in step S1113. After the control of the diaphragm, the processing proceeds to step S1116.

In step S1116, the system controller 230 determines whether the diaphragm driving control performed at the set diaphragm driving speed causes the current exposure amount to reach the target exposure amount. If the current exposure amount reaches the target exposure amount (YES in step S1116), the processing proceeds to step S1119. If the current exposure amount does not reach the target exposure amount (NO in step S1116), the processing proceeds to step S1117.

In step S1117, the system controller 230 determines whether the diaphragm driving speed is already reduced to a setting lower limit value, in such an exposure amount adjustment that the speed of the change in the exposure amount is getting slower as the current exposure amount is approaching the target exposure amount in consideration of the quality of a live view or moving image recording. If the current exposure amount is reduced to the setting lower limit value (YES in step S1117), the processing returns to step S1114, so that the diaphragm continues to be controlled to be reduced to the target exposure amount, keeping that speed. If the current exposure amount is not reduced to the setting lower limit value (NO in step S1117), the processing proceeds to step S1118.

In step S1118, the system controller 230 calculates the exposure amount difference between the current exposure amount and the target exposure amount, and reduces the diaphragm driving speed within a settable range according to the exposure amount difference. After the diaphragm driving speed is reduced, the processing returns to step S1114 to successively control the diaphragm until the exposure amount reaches the target exposure amount.

In step S1119, while moving the focus at a speed slower than the speed for the one-shot AF in consideration of the live view quality, the system controller 230 causes the focus lens 101 to make a extremely small reciprocating motion generally called wobbling driving to detect a focus direction for achieving a high contrast. After the detection, the focus lens 101 is driven in the focus direction by a predetermined defocus amount at a slow speed. Repeatedly performing step S1118 during the live view realizes the continuous AF. Upon completion of the above-mentioned driving of the focus lens 101 which constitutes a part of the continuous AF operation, the processing proceeds to step S1110.

Execution of the above-mentioned operation enables optimizing the followability of an exposure amount adjustment at the time of execution of one-shot AF in response to an explicit operation input, and during constant execution of an exposure amount adjustment and continuous AF.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-240869 filed Oct. 19, 2009, which is hereby incorporated by reference herein in its entirety.

What is claimed is:

1. An imaging apparatus, to which a lens apparatus provided with a diaphragm for adjusting an amount of incident light is detachably attached, comprising:
  an operation member configured to perform an operation made by a user to indicate a start of a focus detection;
  a focus detection unit configured to detect a focusing state of the lens apparatus, and to start a detection of the focusing state based on the operation; and
  an exposure control unit configured to switch between a first control and a second control to control a diaphragm driving speed according to a type of the lens apparatus during a live view,
  wherein, in the first control, the exposure control unit controls the diaphragm within an adjustment time interval for adjusting an exposure amount to maintain such a relationship that (1) the diaphragm driving speed, when an image signal for a moving image is generated, is slower than the diaphragm driving speed for detection of the focusing state in which the detection is started based on the operation, and (2) the adjustment time interval when an image signal for a moving image is generated is larger than the adjustment time interval for detection of the focusing state in which the detection is started based on the operation, and
  wherein the exposure control unit controls the diaphragm by the second control that is different from the first control.

2. The imaging apparatus according to claim 1, wherein the exposure control unit changes the control operation based on an output of the detection unit.

3. An imaging apparatus, to which a lens apparatus provided with a diaphragm for adjusting an amount of incident light is detachably attached, the imaging apparatus comprising:
  an imaging unit configured to generate an image signal by photoelectrically converting an object image;
  an operation member configured to perform an operation made by a user to indicate a start of a focus detection;
  a detection unit configured to detect that a diaphragm driving speed of an attachment of the lens apparatus is variable;
  a focus detection unit configured to detect a focusing state of the lens apparatus, and to start a detection of the focusing state based on the operation of the operation member; and
  an exposure control unit configured switch between a first control and a second control to control a diaphragm driving speed according to a type of the lens apparatus during a live view, wherein, in the first control, the exposure control unit controls the diaphragm within an adjustment time interval for adjusting an exposure amount to maintain such a relationship that (1) the diaphragm driving speed, when the image signal for a moving image is generated, is slower than the diaphragm driving speed for detection of the focusing state in which the detection is started based on the operation of the operation member, and (2) the adjustment time interval when an image signal for a moving image is generated is larger than the adjustment time interval for detection of the focusing state in which the detection is started based on the operation,
  wherein the exposure control unit controls the diaphragm by the second control that is different from the first control, and
  wherein the exposure control unit changes the driving speed according to whether the moving image is being recorded.

4. The imaging apparatus according to claim 1, wherein the exposure control unit reduces the diaphragm driving speed in a stepwise or continuous manner during the second control operation.

5. The imaging apparatus according to claim 1, further comprising a selection unit configured to select whether to set the diaphragm driving speed to be variable based on an operation input of a user.

6. The imaging apparatus according to claim 1, further comprising a display control unit configured to stop updating a display of the image signal onto a display unit, turn the display into a black screen, turn off a light of the display, or switch to a display of information related to still image shooting, when an exposure amount is adjusted for the still image shooting.

7. The imaging apparatus according to claim 1, further comprising a display control unit configured to stop updating a display of the image signal onto a display unit, turn the display into a black screen, turn off a light of the display, or switch to a display of information related to still image shooting, when the focusing state is detected by the focus detection unit.

8. An imaging apparatus comprising:
an imaging unit configured to generate an image signal by photoelectrically converting an object image;
an operation member configured to perform an operation made by a user to indicate a start of a focus detection;
a focus detection unit configured to detect a focusing state of the lens apparatus, the focus detection unit including a plurality of different focus detection modes, wherein the focus detection unit is configured to start a detection of a focus state based on the operation of the operation member;
a detection unit configured to detect that a diaphragm driving speed of an attachment of the lens apparatus is variable; and
an exposure control unit configured to switch between a first control and a second control the diaphragm driving speed according to a type of the lens apparatus during a live view, wherein, in the first control, the exposure control unit controls the diaphragm within an adjustment time interval for adjusting an exposure amount according to an output from the imaging unit and a focus detection mode of the focus detection unit,
wherein the focus detection is started based on the operation of the operation member, wherein the exposure control unit controls the diaphragm by the second control such that the adjustment time interval in the second control is larger than the adjustment time interval in the first control.

9. An imaging apparatus, to which a lens apparatus provided with a diaphragm for adjusting an amount of incident light is detachably attachable, the imaging apparatus comprising:
an imaging unit configured to generate an image signal by photoelectrically converting an object image;
an operation member configured to perform an operation by a user to indicate a start of a focus detection;
a detection unit configured to detect that a diaphragm driving speed of an attachment of the lens apparatus is variable; and
a focus detection unit configured to detect a focusing state of the lens apparatus, the focus detection unit including a plurality of different focus detection modes, wherein the focus detection unit is configured to start a detection of the focusing state based on the operation of the operation member,
wherein the exposure control unit switches between a first control and a second control the diaphragm driving speed according to a type of the lens apparatus,
wherein, in the first control, the exposure control unit controls the diaphragm within an adjustment time interval for adjusting an exposure amount according to an output from the imaging unit and the focus detection mode of the focus detection unit, wherein the exposure control unit controls the diaphragm by the second control such that the adjustment time interval in the second control is larger than the adjustment time interval in the first control,
wherein the focus detection unit includes a first focus detection mode in which, once the focusing state is detected, a lens is not driven for focusing after that, and a second focus detection mode in which the focus detection unit follows a change in a position of an imaging plane according to a change in a distance to an object to make a correction, and
wherein the focus detection is started based on the operation of the operation member.

10. The imaging apparatus according to claim 3, wherein the exposure control unit reduces the diaphragm driving speed in a stepwise or continuous manner during the second control operation.

11. The imaging apparatus according to claim 3, further comprising a selection unit configured to select whether to set the diaphragm driving speed to be variable based on an operation input of the user.

12. The imaging apparatus according to claim 3, further comprising a display control unit configured to stop updating a display of the image signal onto a display unit, turn the display into a black screen, turn off a light of the display, or switch to a display of information related to still image shooting, when an exposure amount is adjusted for the still image shooting.

13. The imaging apparatus according to claim 3, further comprising a display control unit configured to stop updating a display of the image signal onto a display unit, turn the display into a black screen, turn off a light of the display, or switch to a display of information related to still image shooting, when the focusing state is detected by the focus detection unit.

14. The imaging apparatus according to claim 8, wherein the focus detection unit includes a first focus detection mode in which, once the focusing state is detected, a lens is not driven for focusing after that, and a second focus detection mode in which the focus detection unit follows a change in a position of an imaging plane according to a change in a distance to an object to make a correction.

15. The imaging apparatus according to claim 8, wherein the exposure control unit reduces the diaphragm driving speed in a stepwise or continuous manner during the second control operation.

16. The imaging apparatus according to claim 8, further comprising a selection unit configured to select whether to set the diaphragm driving speed to be variable based on an operation input of the user.

17. The imaging apparatus according to claim 8, further comprising a display control unit configured to stop updating a display of the image signal onto a display unit, turn the display into a black screen, turn off a light of the display, or switch to a display of information related to still image shooting, when an exposure amount is adjusted for the still image shooting.

18. The imaging apparatus according to claim 8, further comprising a display control unit configured to stop updating a display of the image signal onto a display unit, turn the display into a black screen, turn off a light of the display, or switch to a display of information related to still image shooting, when the focusing state is detected by the focus detection unit.

19. The imaging apparatus according to claim 9, wherein the exposure control unit reduces the diaphragm driving speed in a stepwise or continuous manner during the second control operation.

20. The imaging apparatus according to claim 9, further comprising a selection unit configured to select whether to set the diaphragm driving speed to be variable based on an operation input of the user.

21. The imaging apparatus according to claim 1, wherein the exposure control unit configured to switch between a first control operation for maintaining a fixed diaphragm driving speed and a second control operation for enabling variation of a diaphragm driving speed, wherein the exposure control unit controls the diaphragm driving speed according to an output from the imaging unit during the second control operation to maintain such a relationship that the diaphragm driving speed when the image signal for a moving image is generated is slower than the diaphragm driving speed for detection of the focusing state.

22. The imaging apparatus according to claim 3, wherein the exposure control unit configured to switch between a first control operation for maintaining a fixed diaphragm driving speed and a second control operation for enabling variation of a diaphragm driving speed, wherein the exposure control unit controls the diaphragm driving speed according to an output from the imaging unit during the second control operation to maintain such a relationship that the diaphragm driving speed when the image signal for a moving image is generated is slower than the diaphragm driving speed for detection of the focusing state by the focus detection unit, wherein the exposure control unit changes the driving speed according to whether the moving image is being recorded during the second control operation.

23. The imaging apparatus according to claim 8, wherein the exposure control unit configured to switch between a first control operation for maintaining a fixed diaphragm driving speed and a second control operation for enabling variation of the diaphragm driving speed, wherein the exposure control unit controls the diaphragm driving speed according to an output from the imaging unit and the focus detection mode of the focus detection unit during the second control operation.

24. The imaging apparatus according to claim 9, wherein the exposure control unit configured to switch between a first control operation for maintaining a fixed diaphragm driving speed and a second control operation for enabling variation of the diaphragm driving speed, wherein the exposure control unit controls the diaphragm driving speed according to an output from the imaging unit and the focus detection mode of the focus detection unit during the second control operation.

* * * * *